United States Patent [19]

Dolezych et al.

[11] Patent Number: 4,915,434

[45] Date of Patent: Apr. 10, 1990

[54] APPARATUS FOR SHORTENING AND FASTENING A STRAP TO WRAP AND HOIST A LOAD

[75] Inventors: Udo Dolezych, Im Grund 26, 5804 Herdecke; Rupprecht Graf, Cologne, both of Fed. Rep. of Germany

[73] Assignee: Udo Dolezych, Herdecke, Fed. Rep. of Germany

[21] Appl. No.: 186,056

[22] Filed: Apr. 25, 1988

[30] Foreign Application Priority Data

| | | | |
|---|---|---|---|
| May 3, 1987 | [DE] | Fed. Rep. of Germany | 3714756 |
| Jul. 3, 1987 | [DE] | Fed. Rep. of Germany | 3722070 |
| Aug. 21, 1987 | [DE] | Fed. Rep. of Germany | 3727918 |

[51] Int. Cl.$^{4}$ ........................ B66C 1/10; A44B 11/06; F16G 11/14

[52] U.S. Cl. ........................................ 294/74; 294/75; 294/82.12; 24/68 C; 24/136 R; 24/134 R

[58] Field of Search .................. 294/82.12, 74, 75, 76, 294/77, 67.4, 67.41, 82.11, 81.1, 68.3, 82.24; 24/68 CD, 68 D, 69 ST, 69 CT, 71 ST, 68 F, 68 C, 115 K

[56] References Cited

U.S. PATENT DOCUMENTS

| | | | |
|---|---|---|---|
| 2,761,725 | 9/1956 | Rushing | 294/75 |
| 3,214,812 | 11/1965 | Beneduce | 294/74 |
| 3,242,542 | 10/1964 | Tako | 24/68 F |
| 3,778,095 | 12/1973 | Carr | 294/74 |
| 3,858,279 | 1/1975 | Brattstrom | 24/68 F |
| 4,525,007 | 7/1985 | Chapalain | 294/74 |

*Primary Examiner*—Margaret A. Focarino
*Assistant Examiner*—Dean J. Kramer
*Attorney, Agent, or Firm*—Nils H. Ljungman

[57] ABSTRACT

An apparatus is provided to shorten and/or fasten flat belts or straps for wrapping and hoisting a load. The apparatus includes a vertical base plate having a crane lug located in its upper portion. Also, at least three deflectors with free ends are mounted in spaced apart relation on the plate so as to project generally perpendicularly therefrom. The free ends of the straps or belts are inserted into the apparatus and pulled between and looped about the deflectors in a meandering fashion to affix the belts to the apparatus before hoisting the load.

13 Claims, 8 Drawing Sheets

APPARATUS FOR SHORTENING AND FASTENING A STRAP TO WRAP AND HOIST A LOAD

BACKGROUND OF THE INVENTION

1. Field of the Invention

The invention relates to an apparatus for shortening and/or fastening a flat belt or strap for wrapping and hoisting a load.

2. Background of the Prior Art

In the prior art, high-strength flat belts or straps have frequently been used to hoist loads. Belts or straps have advantages over ropes or chains in a number of practical applications, in particular for hoisting fragile merchandise, machine parts, motor vehicles, etc. In addition, the handling of such straps or belts requires less physical exertion on the part of the operators and handling personnel. Thus, there is the advantage of allowing more rapid and efficient loading and unloading. There are similar advantages to the use of high-strength woven synthetic straps or belts in lashing loads for shipment.

Belts or straps are also suitable for hoisting heavy loads because, in contrast to cables or chains, significantly less labor is required to fasten them. Also, damage to the merchandise caused by metal lashing elements of cables or chains can be prevented if straps or belts are used. However, in contrast to chains, for example, a belt or strap is not as easy to shorten to the optimal or required length. For attachment to crane hooks, therefore, such belts in conventional applications are reinforced, at least on the ends, and are fitted with sewn loops.

Moreover, for merchandise or loads which must be slung in a particular manner, it is necessary to maintain a rather large inventory of belts or straps of different lengths or with different fittings. This makes the loading and unloading more expensive and more complicated. Since it requires additional material and labor, it contributes to an undesirable increase in loading and unloading costs.

DE-OS 30 42 364 describes an apparatus for lashing and fastening a strap, in which the strap has a ready-made loop on one end, and the other end is inserted or threaded into the apparatus. To shorten the strap, it is first pulled through the apparatus. Then, to lash or hoist a load or merchandise, it is fastened tight. The prior art includes a number of equivalent and similar devices, including so-called turnbuckles, e.g. as described in DE-PS 32 03 750. However, on the one hand, such devices are relatively expensive and complicated, while, on the other hand, they are not suitable for large loads.

Apparently, therefore, the prior art lacks an absolutely uncomplicated, heavy-duty, low-maintenance, easy-to-operate apparatus suitable for hoisting or lashing heavy loads by means of belts or straps of the type described above on a crane hook. Additionally, the prior art fails to provide an apparatus which eliminates the need for ready-made loops on the ends of the straps or an assortment of different lengths of straps or belts, and at the same time makes it possible to easily shorten the belt or strap as necessary.

SUMMARY OF THE INVENTION

An object of the invention, therefore, is to eliminate the principal disadvantages of the turnbuckles described above for belts and straps. Another object is to create an apparatus which is very simple, sturdy, economical, safe and easy to operate. Yet another object is to provide an apparatus which can be used to shorten and/or fasten flat belts or straps used to wrap and hoist a load. Still another object is to provide an apparatus which is also suitable for heavy loads which are much larger than the allowable load ranges of turnbuckles and similar belt connectors etc. of the prior art.

The apparatus, which must of course meet the high safety requirements set by standardized rules for industrial connectors and fasteners, makes it possible to easily use belt or strap material without ready-made loops. In the apparatus of the invention, particular emphasis is placed on the easy and uncomplicated shortening or lengthening of a belt strap used to lash heavy loads.

The apparatus has a vertical base plate which can have a crane lug located in its upper portion. The base plate also mounts at least three deflectors thereon having free outer ends. The free ends of the straps or belts to be shortened and/or fastened are inserted or threaded into the apparatus about the deflectors. The deflectors are designed and oriented so that they at least partly deflect the shortenable belt ends looped around them in a meandering fashion. In such manner, the belt ends are fastened to the deflectors of the apparatus before hoisting the load.

An apparatus of the type described above displays very advantageous handling characteristics when a belt or strap is being fastened while no tension is exerted on it. The same is true for releasing the strap or belt from the area in which it is wrapped around the deflectors. The apparatus can also be adapted to permit fastening and release of the belt where a collective load, e.g. of long material such as rods, logs or tubes, is being hoisted where the end of the belt to be fastened, shortened or released is under tensile stress already. In the latter case, the prestress in the wrapping area of the deflectors produces retaining forces and/or clamping forces which make it considerably more difficult to pull the belt through, both when wrapping the bundle and when releasing the wrapped belt during unloading if the lowered bundle tends to spread and exert tensile forces on the strap wrapped around it.

DETAILED DESCRIPTION OF THE INVENTION

Figure 1:
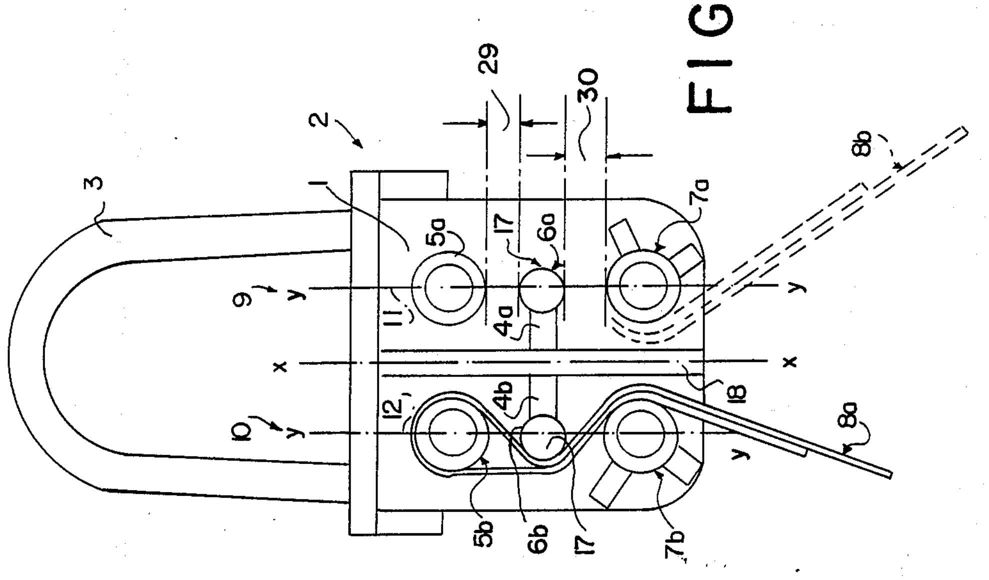
FIG. 1 is a front elevational view of a first embodiment of the apparatus of the invention.

Referring now to FIG. 1, there is illustrated the apparatus of the invention to shorten and/or fasten synthetic fiber flat belts or straps 8. The apparatus comprises a vertical base plate 1 with a crane lug 3 located in its upper portion 2. Mounted on this base plate 1, on both sides 9, 10 of a plane of symmetry x—x perpendicular to the base plate 1, there are three deflectors 5, 6, 7 which project perpendicularly at distances (or gaps) from one another. On the right side or half 9 of the plane of symmetry x—x are mounted the deflectors 5*a*, 6*a*, 7*a*, whereas on the left side or half 10 are mounted the deflectors 5*b*, 6*b*, 7*b*.

Figures 3A, 3B, 3C, 3D:
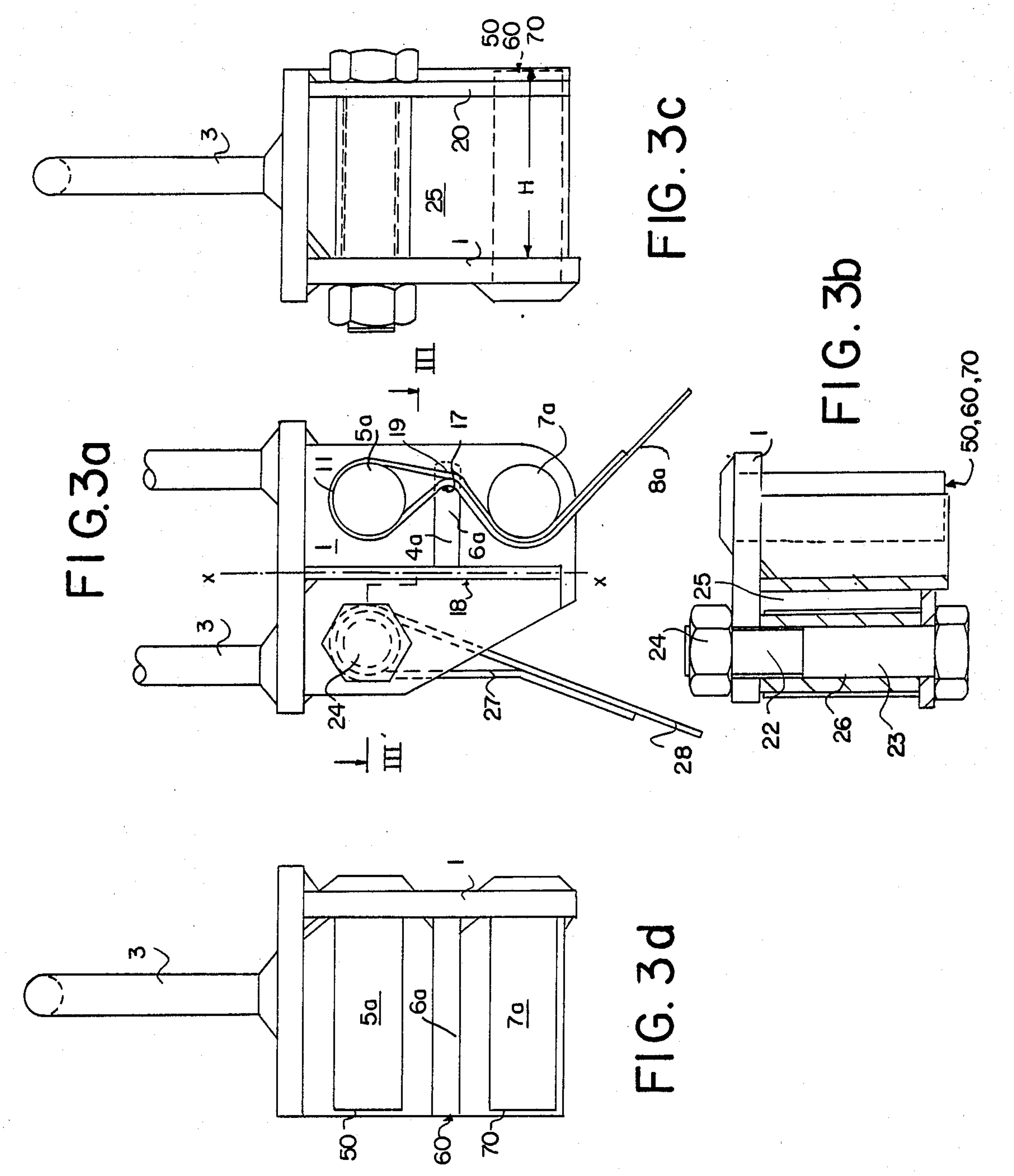
FIG. 3*a* is a front elevational view of a third embodiment of the apparatus of the invention.
FIG. 3*b* is a sectional view of the third embodiment of the apparatus taken along line III—III of FIG. 3*a*.
FIG. 3*c* is a side elevational view of the third embodiment of the apparatus as seen from the left side of FIG. 3*a*.
FIG. 3*d* is another side elevational view of the third embodiment of the apparatus as seen from the right side of FIG. 3*a*.

As shown in FIGS. 3*b* to 3*d*, these deflectors 5, 6, 7 which project perpendicularly to the base plate 1, have free ends 50, 60, 70. The provision of the free ends 50, 60, 70 on the deflectors 5, 6, 7 is an advantageous configuration in that insertions gaps 29, 30 are left between the deflectors 5, 6, 7 which are open to the outside for receiving the belt 8. These insertion gaps 29, 30 allow unhindered insertion of one end of the belt 8 between the deflectors 5, 6, 7, as clearly shown in the figures. The troublesome "threading", which would be necessary with an apparatus closed on the outside of the deflectors 5, 6, 7, and which would be altogether impossible with loops, is made possible or facilitated by the provision of the insertion spaces or gaps 29, 30 open to the outside.

The deflectors 5, 6, 7 are also designed and oriented so that they at least partly deflect the shortenable end of the belt 8 so that it loops around the deflectors in a meander fashion. In places, the end of the belt 8 is looped in two layers. In the deflected portions, and in particular where the end of the belt 8 is overlapped double, drag forces are produced by surface friction which serve to hold the end of the belt in place. These drag forces are dynamic, i.e. they increase with increasing tension on the belt 8. Accordingly, the greater the tension acting on the end of the belt 8, the greater the friction forces of the overlapping belt end caused by the meandering looping. An advantage of this configuration is that the belt 8*a*, 8*b* is not subjected to a locally high surface pressure to hold it, as in the case in clamping devices of the prior art which can damage the belt. In the apparatus according to the invention, on the other hand, at no point of the looped end of the belt 8 are local forces exerted thereon which exceed the tensile forces exerted on the belt.

By way of example, FIG. 1 shows one configuration or embodiment of the apparatus in which on both sides 9, 10 of the vertical plane of symmetry x—x extending perpendicular to the base plate 1, there are two rows 11, 12 of essentially identical deflectors 5*a*, 6*a*, 7*a* and 5*b*, 6*b*, 7*b* at approximately equal transverse distances from the plane of symmetry x—x. The sets of deflectors are provided in respective lines y—y oriented parallel to the plane of symmetry x—x. This apparatus is extraordinarily compact, and makes it possible to insert and fasten in the two halves of the base plate 1 the two belt ends 8*a*, 8*b* without there being any ready-make loops therein.

Figure 2:
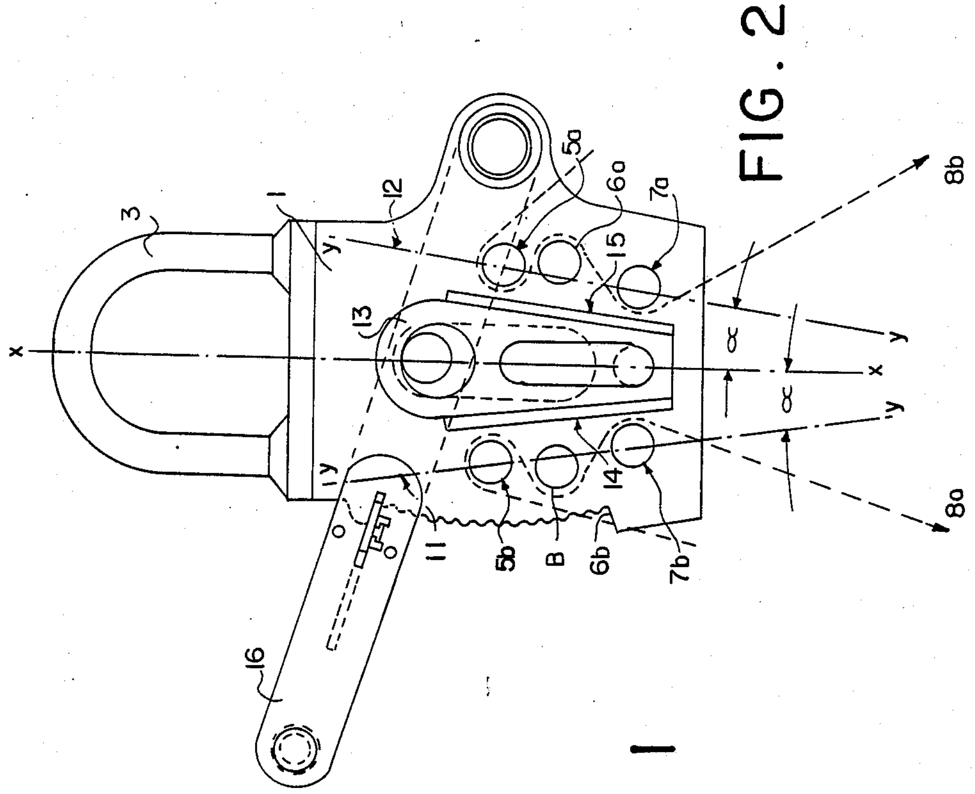
FIG. 2 is a front elevational view of a second embodiment of the apparatus of the invention.

FIG. 2 illustrates a second configuration or embodiment of the apparatus having the rows 11, 12 of deflectors 5, 6, 7, wherein the upper deflectors 5*a*, 5*b* and lower deflectors 7*a*, 7*b* of the sets of deflectors are provided in respective lines y—y oriented at acute angles "a" to the plane of symmetry x—x. The middle deflectors 6*a*, 6*b* are offset outward from the lines y—y by an amount "B" transverse to the plane of symmetry x—x. The amount of the offset can be between 2 mm and 20 mm, preferably between 4 mm and 8 mm. As a result of this offset, the looping angle of the end 8*a* or 8*b* of the belt around the deflectors 5, 6, 7 can be changed or increased, and thus the contact friction which can be achieved by the deflection can be affected, within limits.

Also in FIG. 2, the two rows 11, 12 of deflectors 5*a* to 7*a* and 5*b* to 7*b* forming the double row are arranged from top to bottom with preferably linearly decreasing transverse distances from the plane of symmetry x—x, forming a configuration at the acute angle "a" to the latter. Also, between the two rows 11, 12 there is a clamp 13. The clamp 13 can be moved vertically, with clamp surfaces 14, 15 parallel to the surfaces of at least two deflectors 5*a*, 7*a* and 5*b*, 7*b* and with manually activated lever means 16 for vertical movement as necessary. Thus, in addition to the friction forces caused by surface friction of belt segments at the deflection points of the deflectors 5, 6, 7, a relatively gentle but effective and controllable additional clamping force is introduced.

It should be mentioned at this point that cylindrical bolts can advantageously be used as the deflectors 5, 6, 7. However, as shown by way of example in FIG. 1, they can also be designed as thick-walled, cylindrical tube segments. Because the deflectors 5, 6, 7 must be sturdy and have a high moment of resistance to bending transverse to the direction in which tension is exerted on the belt ends 8*a* or 8*b*, different configurations of the deflectors can be used as appropriate from case to case. Although cylindrical deflectors 5, 6, 7 result in optimal form and function of the apparatus, deflectors 5 to 7 with other cross-sections are contemplated within the scope of the invention. Thus, for example, one or more deflectors can have a polygonal cross-section, e.g. a triangle, rectangle, pentagon, hexagon, heptagon, octagon, etc. Of course, the flat surfaces of these polygons must have longitudinal edges which are carefully rounded to prevent damage to the strap or belt. To cite one example, if the deflectors have a hexagonal cross-section, increased adherence of the belt 8*a*, 8*b* can be achieved under otherwise identical parameters.

As also shown in the embodiments of FIGS. 1 and 3*a*, the middle deflector 6 can have a surface element set transverse to the axis of symmetry x—x in the form of a rib 4, projecting from the base plate and with a rounded belt fastener or deflector element 17. In this manner, a very favorable load absorption is achieved. In the embodiment of FIG. 1 having a double-sided fastening, a complete compensation of the belt forces and/or load acting on the rib 4 can be achieved. Therefore, this embodiment can be designed so that it is relatively light and narrow. The height "H" of the deflectors 5 to 7 which, as shown in FIG. 3*c*, represents the distance between the top of the base plate 1 and the free ends 50, 60, 70 of the deflectors is at least equal to the width of the belt 8a, 8b, and is preferably between 5 mm and 10 mm greater. It is also appropriate that the free ends 50, 60, 70 be tapered so as to facilitate insertion of the belt 8a, 8b.

The middle deflectors 6a, 6b can be several millimeters higher than the other deflectors, and also can have a cap which covers the outside free end 60. This cap 19, which is illustrated by a thin broken line in FIG. 3a, ensures that the belt 8a, 8b is always correctly inserted and cannot project beyond the free end 60, for example. The belt automatically seats correctly on the other deflectors 5a, 5b and 7a, 7b of the apparatus. Such a configuration increases the safety of the apparatus.

Finally, in the embodiment of the apparatus illustrated by way of example in FIGS. 3a to 3d, there is only one row 11 of deflectors 5a to 7a on only one side of the plane of symmetry x—x or the vertical reinforcing rib 18 coinciding with it. There is a cover plate 20 affixed on the opposite side parallel to the base plate 1 defining a pocket 25 therebetween. The base and cover plates 1, 20 have two coaxial holes 22, 23 (FIG. 3b) defined therethrough. A spacer tube 26 is inserted into the pocket 25 between the plates 1, 20 and a threaded bolt 24 extends through the spacer tube 26 and holes 22, 23 with its axis perpendicular to the base and cover plates 1, 20. A belt loop 27 of the unshortenable belt end 28 is suspended about the spacer tube 26.

The above-described embodiment of the apparatus is characterized by a particularly simple, manageable, compact and economical design, and is also extremely sturdy. It also facilitates handling because the belt loop 27 represents the unshortenable and thereby unchangeable end 28 of the belt, while only the other end 8a needs to be looped around the deflectors 5a to 7a. Handling is therefore particularly easy and simple.

To be able to change belt loops 27 more rapidly, instead of the threaded bolt 24, a plug can be inserted, e.g. with a handle, through the holes 22, 23 in the plates 1, 20, and can be equipped with a rotation lock of the prior art. If appropriate, such a connection can be made between the apparatus and the belt loop by means of an insertable fastener, in this or in a similar form.

Figure 8:
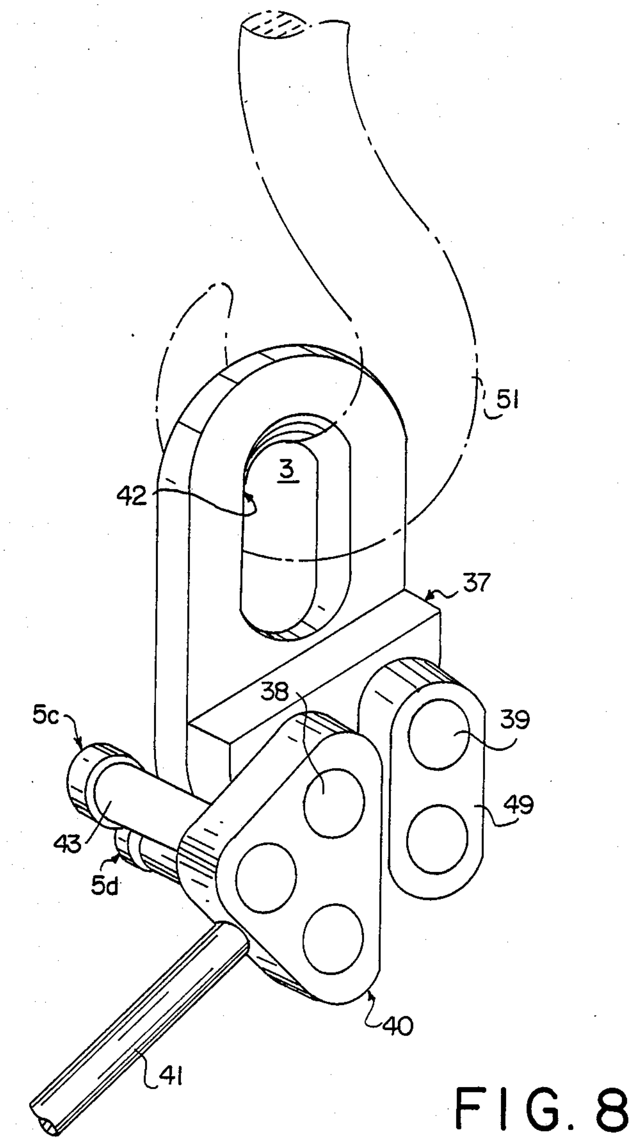
FIG. 8 is a perspective view of the fifth embodiment of the apparatus illustrated in FIG. 6.

Both in the preferred embodiments described above and in those described below, to improve the contact friction between deflectors 5 to 7 and the belt 8, the deflectors, preferably when they are designed as cylindrical bolts, can have an artificially roughened surface 43 (FIG. 8). Such a surface can be very suitably achieved by knurling 43.

Figure 4:
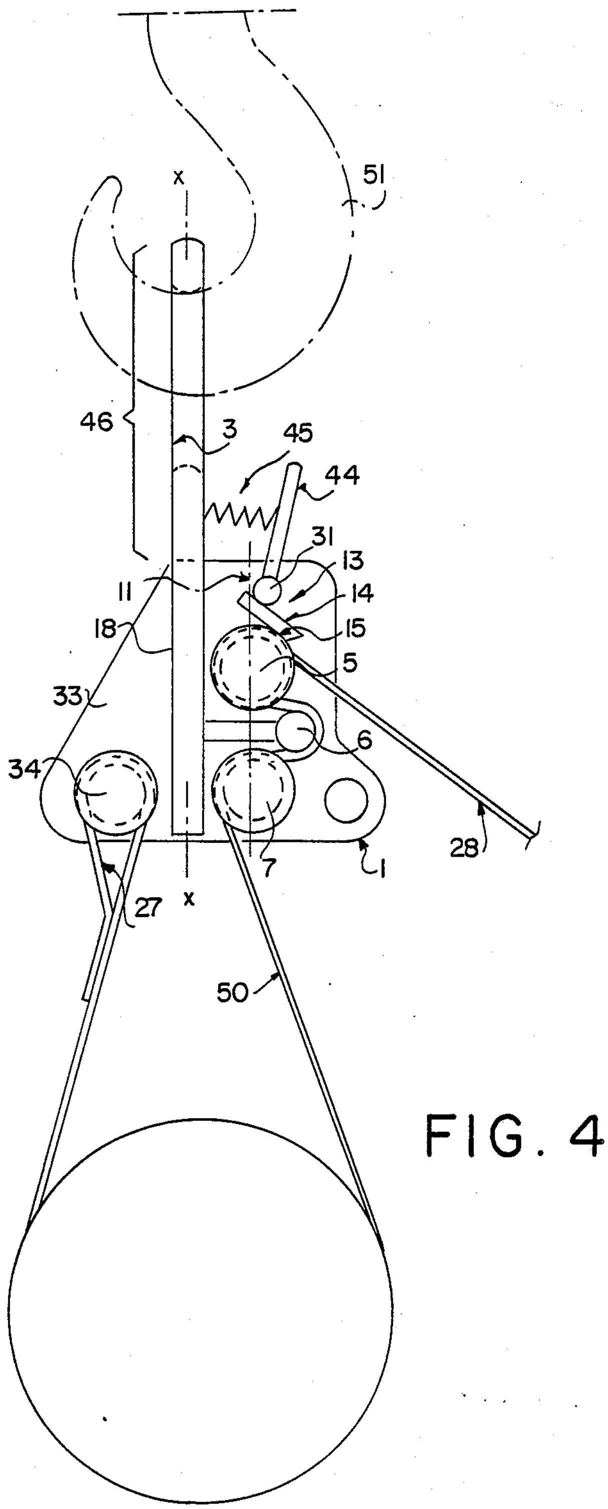
FIG. 4 is a front elevational view of a fourth embodiment of the apparatus of the invention.
Figure 5:
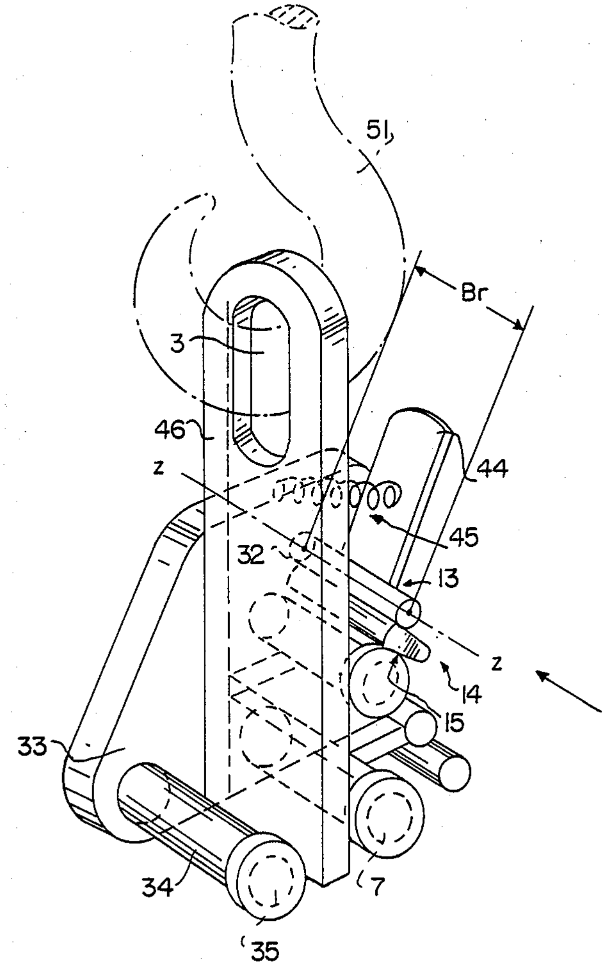
FIG. 5 is a perspective view of the fourth embodiment of the apparatus illustrated in FIG. 4.

In the another alternative configuration or embodiment of the apparatus illustrated in FIGS. 4 and 5, the uppermost bolts or deflectors 5 have a belt lock 13, 14, 15 in the form of a rotation lock 13. The latter includes a shaft 31, with a clamp 14 fastened to it and parallel to the axis of the shaft 31. The clamp has a clamping surface 15 which coincides with the axis and a generating line of the bolt 5. The shaft 31 has a control attachment 44 opposite the clamp 14 and a resetting element 45 in the form of a spring. The shaft 31 of the rotation lock 13 thereby has an axis z—z which is axially parallel to the bolt 5. The center of rotation 32 of the axis z—z is set above the bolt 5. FIG. 5 shows that the rotation lock 13 has a width Br which is essentially the same as the width of the belt.

FIGS. 4 and 5 show that the embodiment with the rotation lock 13 is a very uncomplicated configuration of the invention. The free end 28 of the belt 50 is advantageously wound only once and not twice around the deflectors 5 to 7, and is held fast between the deflectors 5 and rotation lock 13. The mooring action advantageously produces high contact friction forces between the surfaces of deflectors 5 to 7 and the surfaces of the belt 50 in contact with them. The belt remains immovable with contact forces proportional to the load in the vicinity of the deflectors, as long as the rotating wedge 13 keeps the belt end 28 on the generating line of the deflector 5. But as soon as the clamping force is removed by pushing the lever 44 against the force of the spring 45 by hand, the belt 50 or its end 28 can be wound in both directions around the deflectors 5 to 7.

Also, in the embodiment of FIGS. 4 and 5, the base plate 1 has only one row 11 of deflectors 5 to 7 on one side of the plane of symmetry x—x and so on the other side thereof there is a triangular surface 33. The surface 33 has a bolt 34 on which is suspended a belt loop 27. The bolt is parallel to the deflector 7 opposite it, and is essentially symmetrical in relation to the plane of symmetry x—x. As explained above, this arrangement simplifies the ergonomic operation of the apparatus, and is therefore advantageous for practical use.

Figure 6:
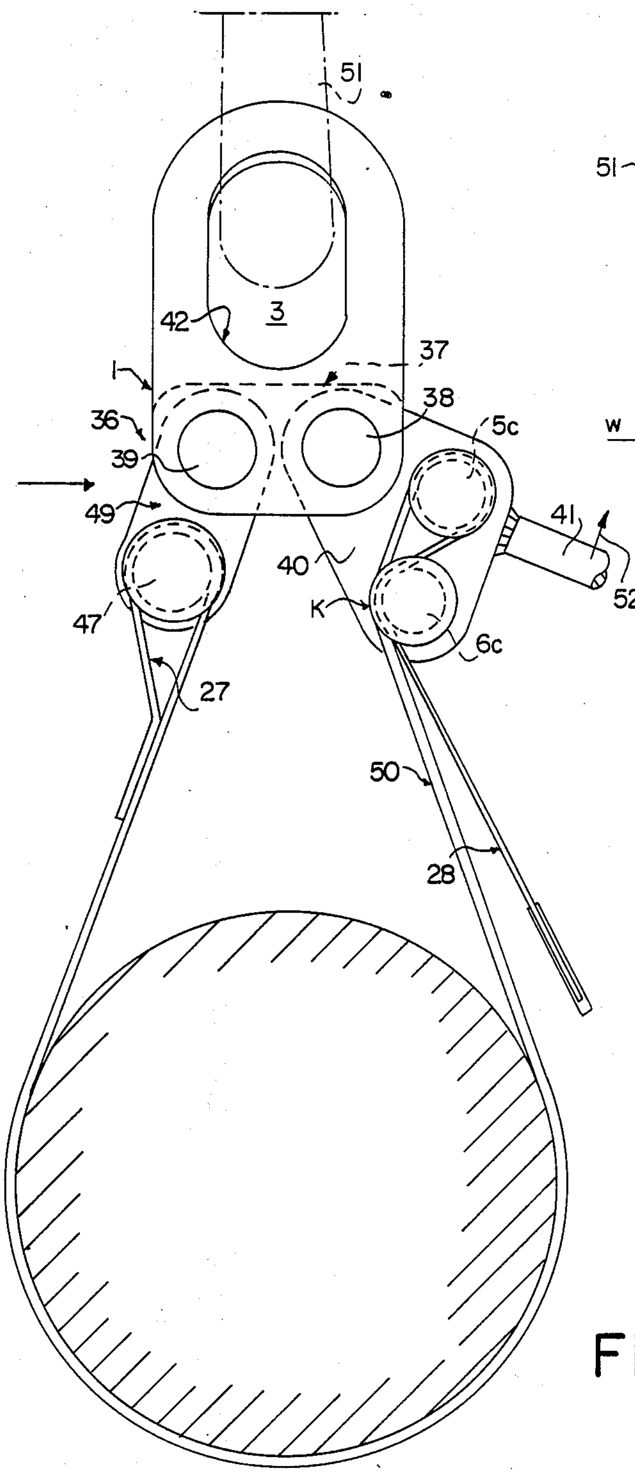
FIG. 6 is a front elevational view of a fifth embodiment of the apparatus of the invention.
Figure 7:
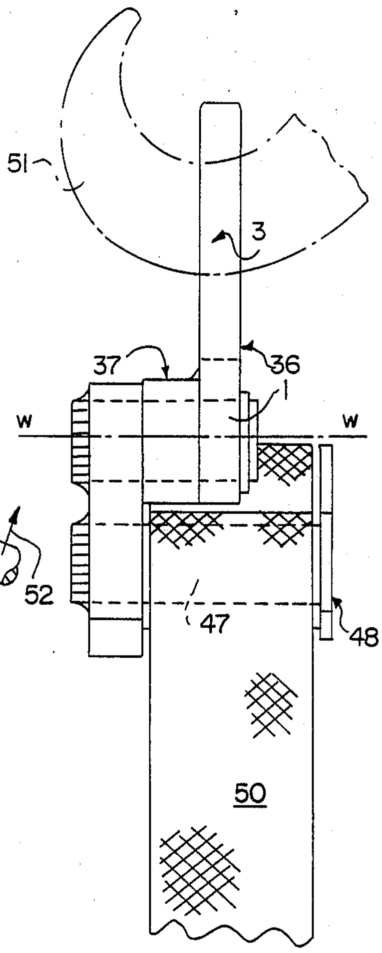
FIG. 7 is a side elevational view of the fifth embodiment of the apparatus illustrated in FIG. 6.

FIGS. 6 to 8 illustrate still another alternative configuration or embodiment of the apparatus in which the base plate 1 has a fitting 37 offset toward the rear with a hinge 38 having an axis w—w perpendicular to the base plate 1. Hinged to it is a swivel 40 with a handle 41 attached thereto. For its part, the base plate 1 is designed with a recess 42 having the form and function of a crane lug 3. This alternative embodiment of the apparatus can also be designed so that the base plate 1 has a second hinge 39, parallel to the first hinge 38, on which a second pivot or swivel 49 is attached. The latter has a stud bolt 47 with a free end 48 on which a belt loop 27 can be suspended. The reverse view shown in FIG. 8 illustrates the parallel orientation of the two swivels 40 and 49.

As shown in FIGS. 6 to 8, the free end 28 of the belt 50 is looped only around the two deflectors 5c and 6c. FIG. 6 shows that the outer belt strand 50, by means of force components, presses the inner belt strand 28 in the direction of the arrow K with a pressure proportional to the load against the contact surface of the deflector 6c. The belt is thereby clamped fast at this point, and the area of the loop around the deflector 5c, produces a winding force which is also proportional to the load. With the surface friction produced in this manner, the belt 50 is immovably fastened and thus trapped in winding around the two deflectors 5c and 6c. By manually moving the handle 41 in the direction of the arrow 52, this entrapment can be loosened or released.

Figure 9:
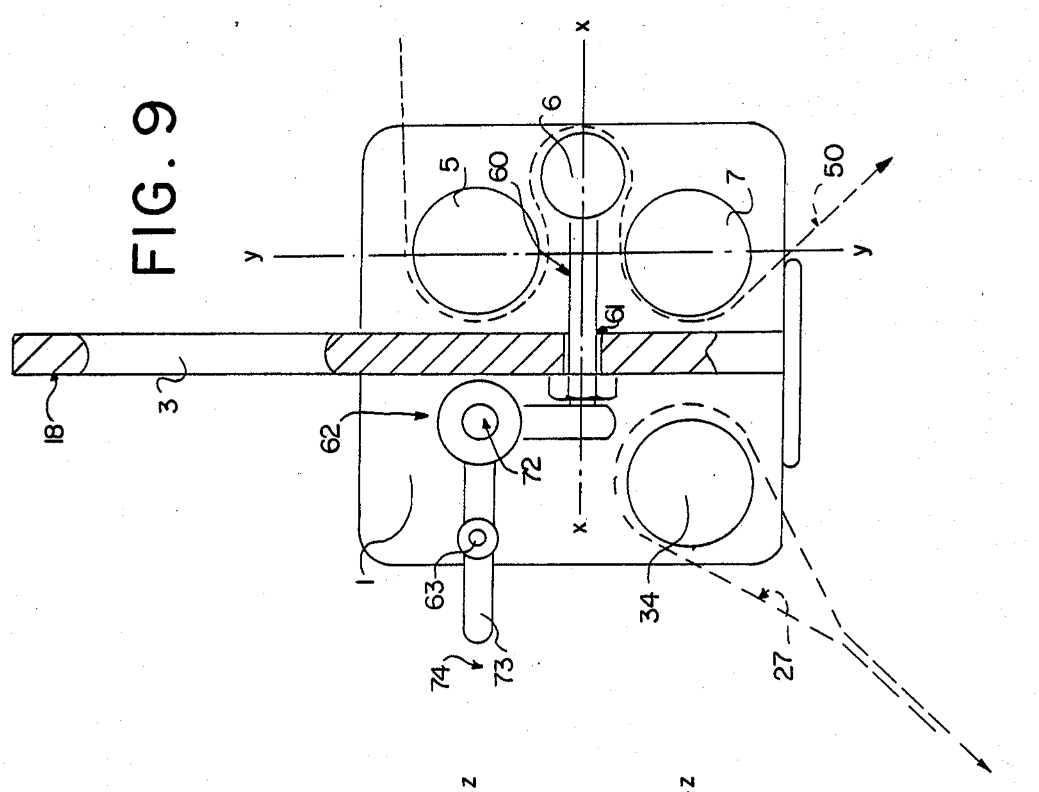
FIG. 9 is a front elevational view of a sixth embodiment of the apparatus of the invention.
Figure 10:
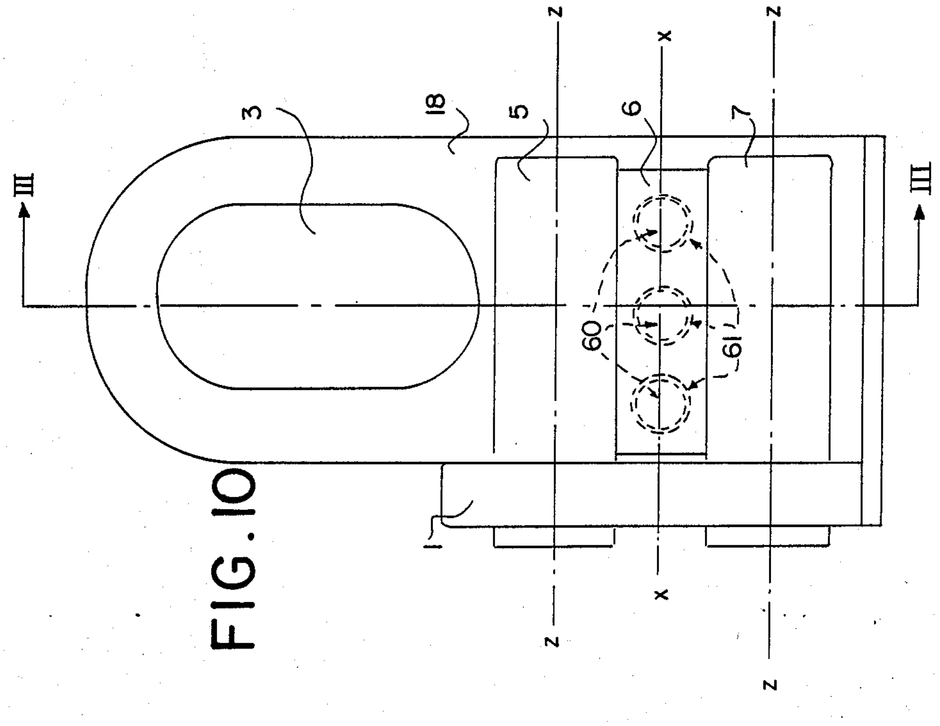
FIG. 10 is a side elevational view of the sixth embodiment of the apparatus illustrated in FIG. 9.

In a further alternative embodiment shown in FIGS. 9 and 10, which is partly identical with the basic principle of the similar embodiments illustrated in FIGS. 3 to 5, the apparatus has a base plate 1 and a central rib 18 mounted on it and perpendicular thereto. The central rib 18 has a crane lug 3 and stands perpendicularly on the base plate 1, with free ends, a top deflector 5 and a bottom deflector 7.

In the space between these deflectors 5 and 7, the deflector 6 is guided so that it can move in a plane x—x, whereby this plane x—x forms a perpendicular intersection with a plane y—y which coincides with the longitudinal axes z—z of the two deflectors 5 and 7. The guide components of the movable deflector 6 include guide elements 60 with their axes arranged parallel in the plane x—x. The guide elements 60 are guided in holes 61, which penetrate the central rib 18. The guide elements 60 are preferably designed as cylindrical bolts.

The guide components of the movable deflector 6 also include resetting elements 62 associated with the guide elements 60. As shown in FIG. 9, the resetting elements 62 can be an arrangement of two articulated levers which pivot around the axis 72, whereby the lever 73 is activated manually. By activating this lever 73 in the direction of the arrow 74, the movable deflector 6 is moved to the right out of a position in which it works together with the deflectors 5 and 7 whereby the combined retaining and clamping forces holding the hoisting strap 50 are eliminated or dispersed. The resetting element 62 on the lever 73 is advantageously designed with a locking catch 63. The latter is shown only schematically in FIG. 9, and is of the ordinary commercial variety.

Figure 11:
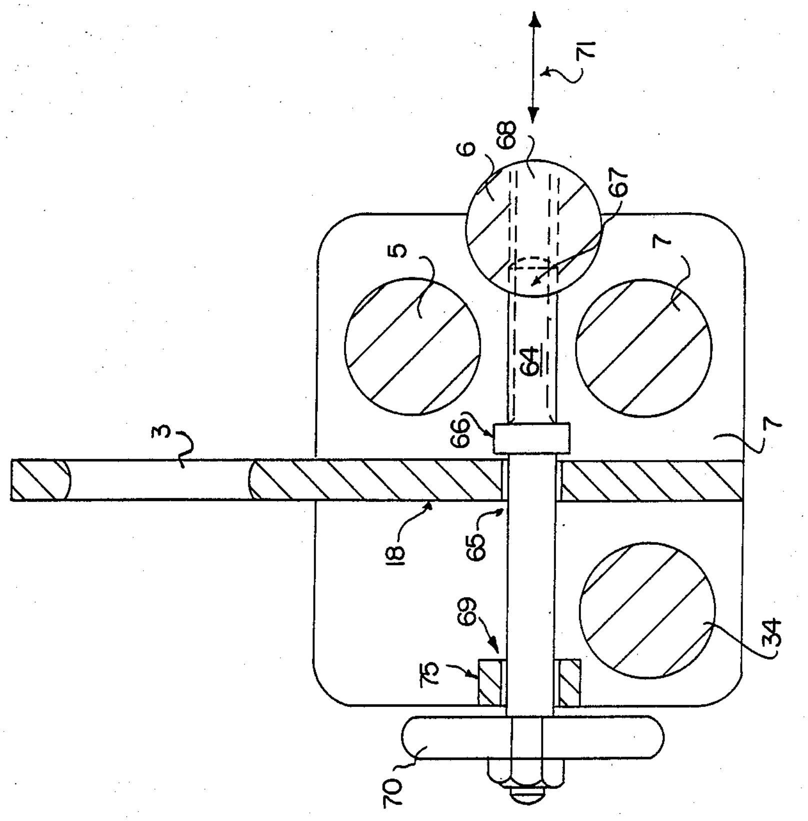
FIG. 11 is a front elevational view of a seventh embodiment of the apparatus of the invention.

A further improved embodiment of the apparatus is illustrated in FIG. 11. In this embodiment, between the guide elements 60, and preferably at half the height of the movable deflector 6, there is a threaded spindle 64 to drive the deflector 6 mounted in a hole 65 in the central rib 18. The threaded spindle 64 is supported by means of an axial shoulder 66 on the spindle, against the guide hole 65 and against the central rib 18. With the free threaded end 67, the threaded spindle 64 is screwed into a threaded hole 68 in the middle deflector 6. On the opposite end 69, the threaded spindle 64 has a handwheel 70 as the control element by means of which it can be screwed in. A second bearing 75 in the shape of a pillow block with a bearing hole can also be advantageously located there.

The embodiment of the apparatus illustrated in FIG. 11 has the advantage that the movable deflector 6 can also be moved by means of the threaded spindle 64, even against rather large forces in either direction exerted by the tensile stress on the belt 50, out of the locked position, to the right in the direction of the arrow 71, and in this position it can be fastened and held. Thus, if the load has been deposited on the ground, and if the bundle spreads and continues to exert tensile forces on the hoisting strap 50 surrounding it, the strap can be released easily by rotating the deflector 6 by means of the threaded spindle 64.

Conversely, in the position of the deflector 6 shown in FIG. 11, a belt can also be pulled through and thereby shortened, even if there is tensile stress being exerted, e.g. with a ratchet, through the open, no-load position. Only then is the movable deflector 6 screwed back into the working position by the appropriate number of spindle rotations into the space between the deflectors 5 and 7. After the trust force of the threaded spindle 64 has been removed, the interaction of the three deflectors 5 and 7 produces retaining and clamping forces proportional to the load.

In the embodiments of the apparatus illustrated in FIGS. 4 to 11, the reinforcing rib 18 which coincides with the axis of symmetry x—x is extended upward to above the base plate 1. In the vicinity of this extension 46, it has a recess in the form of the crane lug 3. In FIGS. 4 to 8, an engaged crane hook is identified by number 51. This configuration results in a very uncomplicated and compact configuration of the apparatus, and makes it more economical to manufacture.

The apparatus according to the invention is relatively uncomplicated, sturdy and relatively compact compared to its usable load capacity. It is also simple, requires no maintenance and, on account of its ergonomic design, is extremely easy to operate. In contrast to clamps of the prior art, it does not damage or squash the belt inside. To this extent, it can be considered an ideal solution to the object of the invention.

We claim:

1. Apparatus to shorten and/or fasten flat belts for wrapping and hoisting a load, comprising:

(a) a base plate being adapted for use in a vertical orientation and having a crane lug defined in an upper portion thereof, said base plate having an extended surface and an edge surface; and (b) a plurality of elongated deflector elements having free ends for being at least in partial removable contact with the belts with said free ends for receiving the belts, and with said deflector elements being attached at ends opposite said free ends to said base plate in spaced apart relation to one another, said deflector elements projecting from said base plate and adapted to have inserted past said free ends thereof and pulled therebetween and deflected and looped thereabout in a meandering fashion the belts to fasten the belts to said deflector elements before hoisting the load; and means for securing a portion of a belt disposed away from the meandering portion of the belt, the load for being disposed between;

the portion of the belt disposed away from the meandering portion of the belt secured by said securing means and the meandering portion of the belt meandering about said deflector elements;

said plurality of deflector elements including at least three deflector elements including at least three deflectors; and said deflector elements projecting generally perpendicularly from the extended surface of said base plate.

2. The apparatus as recited in claim 1 wherein said base plate, on both sides of a plane of symmetry x—x extending perpendicular thereto, has first and second sets of said spaced apart deflector elements.

3. The apparatus as recited in claim 2 wherein said first and second sets of deflector elements form a double row arranged from top to bottom with linearly decreasing transverse distances from the plane of symmetry x—x.

4. The apparatus as recited in claim 2 wherein said first and second sets of deflector elements form a double row.

5. The apparatus as recited in claim 4 wherein a clamp is located between said sets of deflector elements which can move vertically with surfaces of said clamp parallel to and in contact with at least some of said deflector elements.

6. The apparatus as recited in claim 4 wherein upper and lower ones of said deflector elements in each set are in a line y—y oriented parallel to the plane of symmetry x—x.

7. The apparatus as recited in claim 6 wherein a middle one of said deflector elements in each set thereof is offset from the line y—y.

8. The apparatus as recited in claim 7 wherein said middle one of said deflector elements is defined on a rib formed on said base plate and extending transverse to the axis of symmetry x—x.

9. Apparatus to shorten and/or fasten flat belts for wrapping and hoisting a load, comprising:

(a) a base plate being adapted for use in a vertical orientation and having a crane lug defined in an upper portion thereof, said base plate having an extended surface and an edge surface; and (b) a plurality of elongated deflector elements having free ends for being at least in partial removable contact with the belts with said free ends for receiving the belts, and with said deflector elements being attached at ends opposite said free ends to said base plate in spaced apart relation to one another, said deflector elements projecting from said base plate and adapted to have inserted past said free ends thereof and pulled therebetween and deflected and looped thereabout in a meandering fashion the belts to fasten the belts to said deflector elements before hoisting the load; and means for securing a portion of a belt disposed away from the meandering portion of the belt, the load for being disposed between:

the portion of the belt disposed away from the meandering portion of the belt secured by said securing means and the meandering portion of the belt meandering about said deflector elements;

said plurality of deflector elements including at least three deflector elements including at least three deflectors; and said deflector elements projecting generally perpendicularly from the extended surface of said base plate; and wherein a middle one of said deflector elements located in a space between upper and lower ones of said deflector elements is guided for movement in a plane which intersects a plane through the upper and lower deflector elements.

10. The apparatus as recited in claim 1 wherein said deflector elements are located on one side of a center line x—x and a support element on the other side thereof for suspending a loop of a hoisting belt.

11. Apparatus to shorten and/or fasten flat belts for wrapping and hoisting a load, comprising:

(a) a base plate being adapted for use in a vertical orientation and having a crane lug defined in an upper portion thereof;

(b) a plurality of elongated deflector elements having free ends for being at least in partial removable contact with the belts with said free ends for receiving the belts, and with said deflector elements being attached at ends opposite said free ends to said base plate in spaced apart relation to one another, said deflector elements projecting from said base plate and adapted to have inserted past said free ends thereof and pulled therebetween and deflected and looped thereabout in a meandering fashion the belts to fasten the belts to said deflector elements before hoisting the load; and (c) a rotation lock pivotally mounted to said base plate for movement toward and away from one of said deflector elements to apply a clamping force to a belt looped past said one deflector element.

12. The apparatus as recited in claim 1 wherein at least one of said deflector elements has an artificially roughened surface.

13. Apparatus to shorten and/or fasten flat belts for wrapping and hoisting a load, comprising:

(a) a base plate being adapted for use in a vertical orientation and having a crane lug defined in an upper portion thereof;

(b) a plurality of elongated deflector elements having free ends for being at least in partial removable contact with the belts with said free ends for receiving the belts, and with said deflector elements being attached at ends opposite said free ends to said base plate in spaced apart relation to one another, said deflector elements projecting from said base plate and adapted to have inserted past said free ends thereof and pulled therebetween and deflected and looped thereabout in a meandering fashion the belts to fasten the belts to said deflector elements before hoisting the load; and (c) wherein said deflector elements are mounted on at least one swivel element being, in turned, hingedly connected to said base plate.

* * * * *

UNITED STATES PATENT AND TRADEMARK OFFICE
CERTIFICATE OF CORRECTION

PATENT NO. : 4,915,434

DATED : April 10, 1990

INVENTOR(S) : Udo DOLEZYCH, et al.

It is certified that error appears in the above-identified patent and that said Letters Patent is hereby corrected as shown below:

In Column 4, line 60, after "plate" add --1--.

In the "Foreign Application Priority Data" section please change "May 3, 1987" to --May 2, 1987--.

Signed and Sealed this

Twenty-second Day of October, 1991

*Attest:*

HARRY F. MANBECK, JR.

*Attesting Officer* *Commissioner of Patents and Trademarks*